US006884854B2

(12) United States Patent
Schoenfeld et al.

(10) Patent No.: US 6,884,854 B2
(45) Date of Patent: Apr. 26, 2005

(54) COMPOSITION OF EPOXY RESIN, LOW GLASS TRANSITION TEMPERATURE COPOLYMER, LATENT HARDENER AND CARBOXY-TERMINATED POLYAMIDE AND/OR POLYAMIDE

(75) Inventors: Rainer Schoenfeld, Duesseldorf (DE); Hubert Schenkel, Sandhausen (DE); Harald Kuester, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 228 days.

(21) Appl. No.: 10/257,308

(22) PCT Filed: Mar. 31, 2001

(86) PCT No.: PCT/EP01/03699

§ 371 (c)(1),
(2), (4) Date: Mar. 7, 2003

(87) PCT Pub. No.: WO01/94492

PCT Pub. Date: Dec. 13, 2001

(65) Prior Publication Data

US 2003/0187154 A1 Oct. 2, 2003

(30) Foreign Application Priority Data

Apr. 10, 2000 (DE) .......................................... 100 17 784
Apr. 10, 2000 (DE) .......................................... 100 17 783

(51) Int. Cl.$^7$ .............................. C08K 3/36; C08L 9/02; C08L 63/02; C08L 67/00; C08L 77/00
(52) U.S. Cl. ...................... 525/524; 523/428; 523/434; 523/436; 523/467; 525/65; 525/111; 525/113; 525/526; 525/529; 525/530; 525/531; 156/330
(58) Field of Search ................... 523/428, 434, 523/436, 467; 525/65, 111, 113, 524, 526, 529, 530, 531; 156/330

(56) References Cited

U.S. PATENT DOCUMENTS

| | | |
|---|---|---|
| 3,926,904 A | 12/1975 | Scola |
| 4,077,927 A | 3/1978 | McPherson |
| 4,133,803 A | 1/1979 | Klein |
| 4,141,885 A | 2/1979 | Waddill |
| 4,187,367 A | 2/1980 | Waddill |
| 4,403,078 A | 9/1983 | McCoy et al. |
| 4,423,170 A | 12/1983 | Waddill |
| 4,485,229 A | 11/1984 | Waddill et al. |
| 4,507,340 A | 3/1985 | Rinde et al. |
| 4,507,363 A | 3/1985 | Chow et al. |
| 4,514,530 A | 4/1985 | Sellstrom et al. |
| 4,552,933 A | 11/1985 | Sellstrom et al. |
| 4,554,297 A | 11/1985 | Dabi |
| 4,578,412 A | 3/1986 | Sellstrom et al. |
| 4,728,384 A | 3/1988 | Goel |
| 4,940,770 A | 7/1990 | Speranza et al. |
| 4,952,645 A | 8/1990 | Mulhaupt et al. ........... 525/438 |
| 4,959,398 A * | 9/1990 | Oka et al. .................... 523/400 |
| 4,977,214 A | 12/1990 | Bagga |

(Continued)

FOREIGN PATENT DOCUMENTS

| | | |
|---|---|---|
| CA | 1 330 143 | 6/1994 |
| CA | 1 334 700 | 3/1995 |
| CA | 2 039 404 | 9/2002 |
| DE | 198 45 607 A1 | 4/2000 |
| EP | 0 258 556 | 3/1988 |
| EP | 0 272 222 A2 | 6/1988 |
| EP | 0 307 666 A1 | 3/1989 |
| EP | 0 308 664 A1 | 3/1989 |
| EP | 0 309 190 | 3/1989 |
| EP | 0 343 676 A2 | 11/1989 |
| EP | 0 353 190 A2 | 1/1990 |
| EP | 0 354 498 A2 | 2/1990 |
| EP | 0 366 157 A2 | 5/1990 |
| EP | 0 381 625 A2 | 8/1990 |
| EP | 0 338 985 B1 | 5/1994 |
| EP | 0 591 307 B1 | 9/1996 |
| GB | 2 113 690 A | 8/1982 |

OTHER PUBLICATIONS

Mulhaupt, et al., "Toughened Plastics II", Adv. Chem. Ser. 252, American Chemical Soci Washington, D.C. pp. 75–94 (1996).
G. Kotting et al., "Requirements of Adhesives for Structual Vehical Body Construction", Adhesion, Issue 9, pp. 19–26 (1988).
"Adhesives–Determination of dynamic resistance to cleavage of high strength adhesive bonds under impact conditions—Wedge impact method". (ISO 11343). First Edition, pp. 1–8 (Aug. 1993).
"Testing of adhesives for metals; determination of the shear strength of single lap joints by tensile test", (DIN 53 283), Normenstelle Luftfahrt, pp. 1–4 (Nov. 1974).

*Primary Examiner*—Robert Sellers
(74) *Attorney, Agent, or Firm*—Stephen D. Harper

(57) ABSTRACT

Condensation products prepared from cyclic carboxylic anhydrides of dicarboxylic acids, tricarboxylic anhydrides or tetracarboxylic anhydrides and difunctional polyamines, in particular polyoxyalkyleneamines, are suitable as a builder component for epoxy resin compositions. The reaction products based on tricarboxylic anhydrides or tetracarboxylic anhydrides are distinguished by having on average more than one imide group and carboxyl group per molecule. The compositions may optionally also contain condensation products obtained from tri- or poly-functional polyols and/or tri- or poly-functional amino-terminated polymers and cyclic carboxylic anhydrides, wherein the latter reaction products contain on average more than one carboxyl group per molecule. These compositions additionally contain conventional rubber-modified epoxy resins together with liquid and/or solid polyepoxy resins and conventional hardeners and accelerators and optionally fillers and rheology auxiliaries. Such compositions are particularly suitable as impact-resistant, impact/peel-resistant and peel-resistant adhesives in vehicle construction and in electronics. Particularly at very low temperatures, these adhesives exhibit very good impact and peel properties combined with very good corrosion resistance and ageing resistance of the adhesive bond.

17 Claims, No Drawings

U.S. PATENT DOCUMENTS

| | | |
|---|---|---|
| 5,006,611 A | 4/1991 | Schmid et al. |
| 5,025,068 A | 6/1991 | Garcia et al. |
| 5,030,698 A | 7/1991 | Mulhaupt et al. ............ 525/423 |
| 5,073,601 A | 12/1991 | Mulhaupt et al. |
| 5,084,532 A | 1/1992 | Schenkel .................... 525/524 |
| 5,202,390 A | 4/1993 | Mulhaupt et al. |
| 5,218,063 A | 6/1993 | Kimball |
| 5,229,485 A | 7/1993 | Kramer et al. |
| 5,278,257 A | 1/1994 | Mulhaupt et al. ............ 525/454 |
| 5,290,857 A | 3/1994 | Ashida et al. ................. 525/65 |
| 5,334,654 A | 8/1994 | Starner et al. |
| 5,354,789 A | 10/1994 | Kamikado |
| 5,686,509 A | 11/1997 | Nakayama et al. |
| 5,686,557 A | 11/1997 | Kiyohara et al. |
| 5,755,486 A | 5/1998 | Wycech |
| 5,789,482 A * | 8/1998 | Eldin et al. ................... 525/65 |
| 5,891,367 A | 4/1999 | Basheer et al. |
| 6,015,865 A | 1/2000 | Blank et al. ................. 525/524 |
| 6,573,309 B1 | 6/2003 | Reitenbach et al. |
| 6,776,869 B1 | 8/2004 | Schenkel |
| 2001/0009952 A1 | 7/2001 | Tan et al. |
| 2003/0187154 A1 | 10/2003 | Schoenfeld et al. |

\* cited by examiner

COMPOSITION OF EPOXY RESIN, LOW GLASS TRANSITION TEMPERATURE COPOLYMER, LATENT HARDENER AND CARBOXY-TERMINATED POLYAMIDE AND/ OR POLYAMIDE

BACKGROUND OF THE INVENTION

Field of the Invention

This invention relates to mixtures of certain copolymers having at least one glass transition temperature of −30° C. or lower and carboxy-terminated polyamides or polyimides, mixtures of these components with epoxy resins and/or adducts of epoxy resins on the copolymer of low glass transition temperature and/or the polyamide or polyimide, together with thermally activatable latent hardeners for the resin components, and optionally accelerators, fillers, thixotropic auxiliaries and further conventional additives. The present invention also relates to a process for the production of such compositions and to the use thereof as a reactive adhesive.

Reactive, hot-melt epoxy-based adhesives are known. In machinery and vehicle or equipment construction, in particular in aircraft construction, railway vehicle construction or motor vehicle construction, assemblies of various metallic components and/or composite materials are increasingly being joined together with adhesives. Epoxy adhesives are widely used for structural bonds requiring high levels of strength, in particular as thermosetting, single component adhesives, which are frequently also formulated as hot-melt adhesives. Reactive hot-melt adhesives are adhesives which are solid at room temperature and soften at temperatures of up to about 80 to 90° C. and behave like a thermoplastic material. It is only at higher temperatures from about 100° C. that the latent hardeners present in these hot-melt adhesives are thermally activated, resulting in irreversible curing to yield a thermoset material. In order to join components, for example in the vehicle construction industry, the adhesive is initially applied hot on at least one substrate surface and the components to be bonded are then joined. On cooling, the adhesive then solidifies and, by this physical solidification, creates a bond which is sufficiently strong for handling, that is a temporary bond. The components bonded in this manner are further processed in the various rinsing, phosphating and dipcoating baths and the adhesive is only subsequently cured in an oven at relatively high temperatures.

Conventional adhesives and hot-melt adhesives based on epoxy resins are hard and brittle when in the cured state. The adhesive bonds obtained do indeed generally exhibit very high tensile shear strength, but, on exposure to peel, impact or impact/peel stress, particularly at low temperatures, they flake, such that this type of stress readily causes the adhesive joint to fail. Numerous proposals have accordingly already been made to modify epoxy resins using flexible additions in such a manner that the brittleness thereof is reduced significantly. One common method is based on the use of certain rubber adducts on epoxy resins, which are incorporated into the epoxy resin matrix as a heterodisperse phase, such that the epoxides become more impact-resistant, such epoxy resin compositions being described as "toughened". One common modification of epoxy resins of the above type involves reacting a polybutadiene-co-acrylonitrile copolymer having carboxyl end groups with an epoxy resin. This rubber/epoxy adduct is then dispersed in one or more different epoxy resins. In this method, the reaction of the epoxy resin with the butadiene/acrylonitrile rubber containing carboxyl groups must be controlled in such a manner that it does not result in premature curing of the adduct. Although epoxy resin compositions modified in this manner do constitute a distinct improvement with regard to the impact strength thereof in comparison with unmodified epoxy resins, the performance thereof on exposure to peel or impact/peel stress is still inadequate.

DESCRIPTION OF THE RELATED ART

EP-A-0 343 676 discloses hot-melt adhesive compositions which are composed of a mixture of two or more epoxy resins, a phenolic resin and a polyurethane/epoxy adduct. The polyurethane/epoxy adduct consists of a reaction product of two or more polyalkylene glycol homo- and co-polymers having primary and secondary OH groups, a diisocyanate and at least one epoxy resin. It is stated that, in comparison with various commercial one-component hot-melt adhesive compositions, this hot-melt adhesive composition is improved with regard to shear strength, peel strength and impact strength, but no mention is made of the properties of the cured adhesive joint at low temperature.

U.S. Pat. No. 5,290,857 describes an epoxy resin adhesive composition containing an epoxy resin together with a pulverulent core/shell polymer and a heat-activatable hardener for the epoxy resin. The pulverulent core/shell polymer is composed of a core containing an acrylate or methacrylate polymer having a glass transition temperature of −30° C. or lower and a shell containing an acrylate or methacrylate polymer which contains crosslinking monomer units and the glass transition temperature of which is greater than or equal to 70° C., wherein the ratio, by weight, of core to shell is between 10:1 and 1:4. It is stated that these compositions have excellent adhesive properties, such as impact strength, tensile shear strength and T-peel strength and, moreover, have good partial gellability. No details of the low temperature characteristics of adhesive bonds made using these adhesives are stated.

U.S. Pat. No. 5,686,509 similarly describes an adhesion-promoting composition for epoxy resins consisting of pulverulent copolymer particles which are ionically crosslinked using a mono- or di-valent metal cation. In this case, the core of the core/shell polymer is composed of a diene monomer and optionally crosslinking monomer units and has a glass transition temperature of less than or equal to −30° C. The shell copolymer has a glass transition temperature of at least 70° C. and is composed of acrylate or methacrylate monomer units and free-radically polymerisable unsaturated carboxylic acid units. The adhesive composition is intended to comprise, per 100 parts of epoxy resin, 15 to 60 parts, by weight, of adhesion-promoting copolymer powder and 3 to 30 parts, by weight, of a heat-activatable hardener. These compositions are recommended for use as structural adhesives for automotive parts. No details of the low temperature characteristics of adhesive bonds made using these adhesives are stated.

EP-A-0 308 664 discloses epoxy resin compositions which contain an epoxy adduct of a copolymer containing carboxyl groups and based on butadiene/acrylonitrile or similar butadiene copolymers, together with a reaction product of an elastomeric prepolymer soluble or dispersible in epoxy resins and having terminal isocyanate groups with a polyphenol or aminophenol together with subsequent reaction of this adduct with an epoxy resin. Moreover, these compositions may contain one or more epoxy resins.

Amino-functional hardeners, polyaminoamides, polyphenols, polycarboxylic acids and anhydrides thereof or catalytic hardeners and optionally accelerators are also proposed for curing these compositions. It is stated that these compositions are suitable as adhesives which, depending upon the particular composition thereof, may have elevated strength, an elevated glass transition temperature, elevated peel strength, elevated impact strength or elevated crack propagation resistance.

EP-A-0 353 190 similarly describes epoxy resin compositions containing an adduct of an epoxy resin and a carboxylated butadiene/acrylonitrile copolymer together with a reaction product of a hydroxyl-, mercapto- or amino-terminated polyalkylene glycol with a phenolcarboxylic acid with a subsequent reaction of the phenolic group with an epoxy resin. EP-A-0 353 190 states that these compositions are suitable for the production of adhesives, adhesive films, patches, sealing compositions, coatings or matrix resins.

EP-A-338985 describes modified epoxy resins which contain a liquid copolymer based on butadiene, a polar, ethylenically unsaturated comonomer and optionally further ethylenically unsaturated comonomers and also a reaction product of dihydroxy- or diamino-terminated polyalkylene glycols and diisocyanates, together with a monophenol, mercaptoalcohol or an aliphatic lactam. According to the teaching of this document, these compositions may be used for rendering epoxy resins flexible. In addition to the above-stated constituents, the compositions are also intended to contain epoxy resins and a hardener or accelerator. Such mixtures are intended for use as adhesives, adhesive films, patches, matrix resins, coatings or sealing compositions.

EP-A-366157 describes epoxy resins containing poly-alkylene glycol-based polyesters and hardeners active at relatively high temperatures. These compositions contain at least one compound having at least one 1,2-epoxy group per molecule, together with a reaction product of an aliphatic or cycloaliphatic diol with an aromatic hydroxycarboxylic acid and a hardener active at relatively high temperatures for the compound containing epoxy groups. It is explained that the cured epoxy resin mixtures are intended to have very good low temperature flexibility and corrosion resistance. No indication is made as to the suitability thereof as adhesives having elevated peel strength at low temperatures, in particular on exposure to impact stress.

EP-A-272222 describes epoxy resins containing poly-alkylene glycol-based polyesters. These polyesters are derived from aliphatic, cycloaliphatic or aromatic carboxylic acids and/or aromatic hydroxycarboxylic acids and aliphatic or cycloaliphatic diols, wherein at least 70 wt. % of the carboxylic acid derivatives are derived from dimeric and/or trimeric fatty acids. It is stated that such epoxy resin compositions are suitable for providing heat-curable adhesives for bonding steel and aluminum substrates. The cured epoxy resin mixtures apparently have good low temperature flexibility and corrosion resistance.

EP-A-307666 discloses water-insoluble compounds which are substantially free form isocyanate groups and have at least two free phenolic hydroxyl groups per molecule and are obtainable by reacting a polyisocyanate prepolymer, which is an adduct of a polyisocyanate and a prepolymeric polyhydroxyl or polysulfhydryl compound or is derived from a prepolymeric polyetheramine. This polyisocyanate prepolymer is reacted with at least one phenol having two or three phenolic hydroxyl groups or an aminophenol having one or two phenolic hydroxyl groups. These compounds are then combined with epoxy resins and thermally activatable hardeners in order to be usable as adhesives. This document makes no mention of low temperature behavior, in particular on exposure to impact stress.

EP-A-381625 describes curable compositions containing an epoxy resin, a hardener activatable at elevated temperature, a liquid copolymer based on butadiene, acrylonitrile and optionally further ethylenically-unsaturated comonomers, together with a segmented copolymer substantially consisting of recurring soft segments comprising polypropylene glycol or polybutylene glycol units and selected hard segments having a softening temperature of above 25° C. According to the teaching of this document, the segmented copolymers are synthesised from polyether diols based on polypropylene glycol, polytetramethylene glycol or amino-terminated polyether diols and saturated aliphatic dicarboxylic acids having 4 to 12 carbon atoms or aromatic dicarboxylic acids having 8 to 12 carbon atoms and may also contain short-chain diols or diamines in the hard segment thereof. According to the teaching of this document, these compositions are suitable as adhesives, in particular as hot-melt adhesives and as matrix resins or as surface coating compositions. Strength values, in particular peel strengths on exposure to impact stress at low temperature, are not disclosed.

According to the teaching of EP-A-0 354 498 and EP-A-0 591 307, reactive hot-melt adhesive compositions may be produced from a resin component, at least one thermally activatable latent hardener for the resin component optionally together with accelerators, fillers, thixotropic agents and further conventional additives, wherein the resin component is obtainable by reacting an epoxy resin which is solid at room temperature and an epoxy resin which is liquid at room temperature with one or more linear or branched polyoxypropylenes having amino end groups. The epoxy resins should here be used in a quantity, relative to the amino-terminated polyoxypropylene, such that an excess of epoxy groups relative to amino groups is ensured. These adhesive compositions already exhibit elevated peel resistance in the T-peel test, which is retained even at low temperatures.

DE-A-19845607.7, which is as yet unpublished, describes condensation products of carboxylic acid dianhydrides, di- or poly-amines, in particular polyoxyalkyleneamides and polyphenols or aminophenols and the suitability thereof as a builder component for epoxy resin compositions. Compositions of this type additionally contain rubber-modified epoxy resins, together with liquid and/or solid polyepoxides, together with conventional latent hardeners and accelerators and optionally fillers. They are suitable as impact-resistant, impact/peel-resistant and peel-resistant adhesives in automotive construction. Although these adhesive compositions overall already have a very good range of properties even at low temperatures, a requirement still remains for novel and improved adhesive compositions for these applications.

BRIEF DESCRIPTION OF THE INVENTION

An object of the present invention is to improve further reactive adhesives of the above type such that they exhibit adequate flexibility, increased peel strength not only at room temperature but also in particular at low temperatures of below 0° C. In particular, peel strength should be as high as possible at low temperatures on exposure to impact stress, so that structurally bonded components meet modern safety requirements in automotive construction even in the event of an accident (crash behavior). These improvements should be achieved without impairment of either peel strength or tensile shear strength at elevated temperatures. The reactive adhesives must, moreover, have adequate rinse resistance immediately after application and before final curing. To this end, it must be possible to formulate the adhesive compositions as a hot-melt adhesive, as a highly viscous, hot-processed adhesive. Another possibility is to formulate it as an adhesive which may be gelled by a thermal pre-reaction in a "carcass oven" or by induction heating of the parts to be joined.

This object is achieved according to the present invention by the solution stated in the claims. Said solution basically involves the provision of compositions which contain the following constituents:

(A) at least one epoxy resin having on average more than one epoxy group per molecule;

(B) a copolymer having a glass transition temperature of −30° C. or lower and epoxy-reactive groups or a reaction product of such copolymer with a stoichiometric excess of an epoxy resin according to (A);

(C) a latent hardener activatable at elevated temperature, for component (A); and either (D) a reaction product obtainable from a difunctional amino-terminated polymer and a tri- or tetra-carboxylic acid anhydride having on average more than one imide group and carboxyl group per molecule; or (E) a reaction product producible from a tri- or polyfunctional polyol or a tri- or poly-functional amino-terminated polymer and a cyclic carboxylic anhydride, which reaction product contains on average more than one carboxyl group per molecule, or (F) a mixture of the reaction products according to (D) and (E)

DETAILED DESCRIPTION OF THE INVENTION

Components (D) and/or (E) are preferably produced in separate reactions from the acid anhydrides and amino-terminated or hydroxy-terminated polymers. These reaction products may then be reacted with a large stoichiometric excess of epoxy resins (A) or may simply be mixed with such epoxy resins, wherein the thermally activatable hardeners and/or further additives may then be mixed in.

Examples of the copolymers of builder component (B) are 1,3-diene polymers having carboxyl groups and further polar, ethylenically unsaturated comonomers. Butadiene, isoprene or chloroprene may here be used as the diene, with butadiene being preferred. Examples of polar, ethylenically-unsaturated comonomers are acrylic acid, methacrylic acid, lower alkyl esters of acrylic or methacrylic acid, for example the methyl or ethyl esters thereof, amides of acrylic or methacrylic acid, fumaric acid, itaconic acid, maleic acid or the lower alkyl esters or semi-esters thereof, or maleic or itaconic anhydride, vinyl esters, such as vinyl acetate or in particular acrylonitrile or methacrylonitrile. Particularly preferred copolymers (A) are carboxy-terminated butadiene/acrylonitrile copolymers (CTBN), which are commercially available in liquid form under the trade name Hycar by the company B.F. Goodrich. These have molecular weights of between 2000 and 5000 and acrylonitrile contents of between 10 and 30%. Specific examples are Hycar CTBN 1300×8, 1300×13 or 1300×15.

The core/shell polymers known from U.S. Pat. No. 5,290,857 or from U.S. Pat. No. 5,686,509 may also be used as builder component (B). In this case, the core monomers should have a glass transition temperature of less than or equal to −30° C.; these monomers may be selected from the group consisting of the above-mentioned diene monomers or suitable acrylate or methacrylate monomers, and the core polymer may optionally contain a small quantity of crosslinking comonomer units. The shell is built up from a copolymer which has a glass transition temperature of at least 60° C. The shell is preferably prepared from lower alkyl acrylate or methacrylate monomer units (methyl or ethyl ester), together with polar monomers, such as (meth) acrylonitrile, (meth)acrylamide, styrene or free-radically polymerisable unsaturated carboxylic acids or carboxylic anhydrides.

Another possibility for builder component (B) is to use dendrimers, which are also known as dendritic polymers, cascade polymers or "starburst" polymers. As is known, they are built up in a step-wise manner by linking two or more monomers with each monomer already bonded, such that the number of monomer end groups grows exponentially with each step, ultimately resulting in a spherical tree-like structure. Such dendrimers may, for example, be produced by Michael addition of acrylic acid methyl esters and ammonia or amines.

The adducts of epoxy resins and the above-mentioned liquid CTBN rubbers are, however, particularly preferred for builder component (B).

Reaction products (D) may be represented by the following structural formulae (I) and/or (II), while reaction products (E) may be represented by the formula (III) with the structural units (IV) and (V), if the starting components are tri- or poly-functional polyols and all types of carboxylic anhydrides or the starting components comprise tri- or poly-functional amino-terminated polymers with cyclic carboxylic anhydrides of dicarboxylic acids. When tri-and poly-functional amino-terminated polymers are reacted with tri- or tetra-carboxylic anhydrides, the imide structures according to the structural formulae (I) and (II) are obtained.

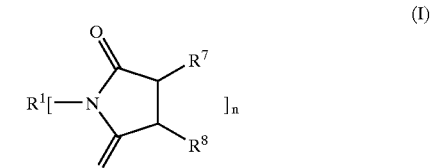

(I)

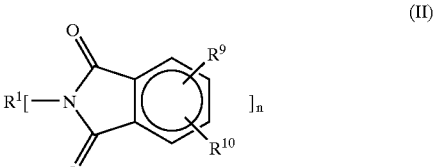

(II)

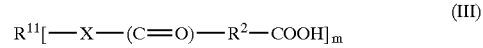

(III)

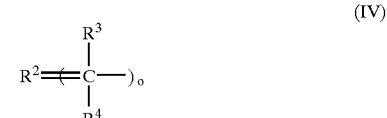

(IV)

(V)

The reaction products according to E) prepared from tri- or poly-functional polyols with all types of carboxylic anhydrides have structures according to the formula (III), wherein X=—O—. Reaction products E) prepared from tri- or poly-functional amino-terminated polymers and carboxylic anhydrides of dicarboxylic acids also give rise to structures according to the structural formula (III), wherein X=—NH—.

In the reaction products (D) according to the structural formulae (I) and (II), R1 represents a difunctional residue of an amino-terminated polymer after removal of the terminal amino group, that is n=2.

The difunctional amino-terminated polymers used for the condensation product (D) may preferably be amino-terminated polyalkylene glycols, in particular difunctional amino-terminated polypropylene glycols, polyethylene glycols or copolymers of propylene glycol and ethylene glycol. These are also known under the name "Jeffamine" (trade name of Huntsman). Difunctional amino-terminated polyoxytetramethylene glycols, also known as poly-THF, are also suitable. Difunctional amino-terminated polybutadiene compounds are moreover suitable as builder components, as are aminobenzoic acid esters of polypropylene glycols, polyethylene glycols or poly-THF (known under the trade name "Versalink oligomeric diamines" from Air Products). The amino-terminated polyalkylene glycols or polybutadienes have molecular weights of between 400 and 6000.

If the above-mentioned difunctional amino-terminated polymers are reacted with aliphatic tricarboxylic anhydrides, such as citric anhydride, 1,2,3-propanetricarboxylic anhydride or aconitic anhydride, the imide structures according to the structural formula (I) are obtained, with either R7 or R8 being an alkylcarboxylic acid residue and the second residue being hydrogen or a non-functional alkyl residue.

When reacting aromatic tri- or tetra-carboxylic anhydrides, imide structures according to the structural formula (II) are obtained wherein R9 and/or R10 represent a free carboxyl group or both together represent a cyclic carboxylic anhydride residue. R9 and/or R10 may, however, also be aryl residues, which are attached to the aromatic ring shown either by a covalent bond or by a heteroatom, at least one of the residues bearing a free carboxyl group. R9 and R10 may furthermore together represent one or more fused aromatic rings, wherein a free carboxyl group must again be present as a substituent on the aromatic system.

Examples of aromatic tri- or tetra-carboxylic anhydrides to be used are 1,2,3- or 1,2,4-benzenetricarboxylic anhydride, mellophanic, pyromellitic, 1,8:4,5- or 2,3:6,7-naphthalenetetracarboxylic, perylene dianhydride, biphenyltetracarboxylic, diphenyl ether tetracarboxylic, diphenylmethanetetracarboxylic, 2,2-diphenylpropanetetracarboxylic, benzophenonetetracarboxylic dianhydride, diphenyl sulfone tetracarboxylic dianhydride or mixtures thereof.

The reaction products (E) prepared from a tri- or poly-functional polyol may be represented by the formula (III), with R11 being a tri- or poly-functional polyol, preferably a trifunctional polyalkylene glycol of the polypropylene glycol, polyethylene glycol type or copolymers thereof or of the poly-THF type. Hydroxy-functional polybutadienes having a functionality of greater than 2 may, however, also be used. When acid anhydrides of dicarboxylic acids, such as maleic anhydride and succinic anhydride, or aliphatic tricarboxylic anhydrides are used, the residue R2 in the formula (III) has the structure (IV), wherein o is two or three and R3 and R4 mutually independently preferably represent H or together represent a further covalent bond. Both residues may, however, also be C1-C12 alkyl or aryl residues optionally bearing carboxyl groups. When aromatic carboxylic anhydrides are used, R2 in the formula (III) may be represented by the structural unit (V). In this structural unit, R5 and R6 may mutually independently be alkyl or aryl groups, but they may also together represent a cyclic carboxylic anhydride fused to the aromatic ring. Another possibility is that R5 and R6 together represent one or more fused rings on the aromatic ring shown in structural unit (V), which fused rings may optionally bear further carboxyl groups.

If tri- or poly-functional amino-terminated polymers are used for the reaction product (E), tri- or tetra-carboxylic anhydrides are preferably used as the second component, such that the cyclic imide structures of the formulae (I) and (II) are obtained. When using carboxylic anhydrides of dicarboxylic acids, the condensation reaction should be controlled such that open-chain amide structures having a free carboxyl group are obtained, such that X represents —NH— in the formula (III).

Specific examples of carboxylic anhydrides are maleic, succinic, citric, 1,2,3-propanetricarboxylic, aconitic, phthalic, 1,2,3- or 1,2,4-benzenetricarboxylic, mellophanic, pyromellitic, 1,8:4,5- or 2,3:6,7-naphthalenetetracarboxylic, perylene dianhydride, biphenyltetracarboxylic, diphenyl ether tetracarboxylic, diphenylmethanetetracarboxylic, 2,2-diphenylpropanetetracarboxylic, benzophenonetetracarboxylic dianhydride, diphenyl sulfone tetracarboxylic dianhydride or mixtures thereof.

Apart from the above-stated carboxylic anhydrides, it is, in principle, also possible to use maleated oils and fats as anhydride components for the production of the condensation product (D) or (E). As is known, maleated oils and fats and low molecular weight polyenes are produced by an ene reaction or by a free-radical reaction of maleic anhydride with unsaturated compounds.

Suitable epoxy resins for component (A) or for forming the epoxy adduct or for blending with components (B) and/or (D) and/or (E) comprise numerous polyepoxides having at least two 1,2-epoxy groups per molecule. The epoxy equivalent of these polyepoxides may range between 150 and 4000. The polyepoxides may, in principle, be saturated, unsaturated, cyclic or acyclic, aliphatic, alicyclic, aromatic or heterocyclic polyepoxy compounds. Examples of suitable polyepoxides include the polyglycidyl ethers obtained by reacting epichlorohydrin or epibromohydrin with a polyphenol in the presence of alkali. Polyphenols suitable for this purpose are, for example, resorcinol, pyrocatechol, hydroquinone, bisphenol A (bis(4-hydroxyphenyl)-2,2-propane)), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, 1,5-hydroxynaphthalene.

Further polyepoxides which are suitable in principle are the polyglycidyl ethers of polyalcohols or diamines. These polyglycidyl ethers are derives from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further polyepoxides are polyglycidyl esters of polycarboxylic acids, for example reaction products of glycidol or epichlorohydrin with aliphatic or aromatic polycarboxylic acids, such as oxalic acid, succinic acid, glutaric acid, terephthalic acid or dimer fatty acid.

Further epoxides are derived from the epoxidation products of olefinically unsaturated cycloaliphatic compounds or from natural oils and fats.

Epoxy resins derived from the reaction of bisphenol A or bisphenol F and epichlorohydrin are particularly preferred. Mixtures of liquid and solid epoxy resins are generally used, wherein the liquid epoxy resins are preferably based on bisphenol A and have a sufficiently low molecular weight. Epoxy resins liquid at room temperature which generally have an epoxy equivalent weight of 150 to about 220 are in particular used for forming the adduct with components (B) and/or (D) and/or (E), with an epoxy equivalent weight range of 182 to 192 being particularly preferred.

The hardness of the reactive adhesive in the cooled state, that is in particular after application onto the substrate to be joined, but before curing, depends in particular upon the degree of condensation and thus the molecular weight of component (D) and upon the ratio of solid epoxy resin to liquid epoxy resin. The higher the degree of condensation (and thus the molecular weight) of condensation product (D) and the greater the proportion of solid epoxy resin in the composition, the harder the cooled, semi-crystalline adhesive.

Thermally activatable or latent hardeners (C) which may be used for the epoxy resin binder system comprising components (A), (B) and (D) and/or (E) are guanidines, substituted guanidines, substituted ureas, melamine resins, guanamine derivatives, cyclic tertiary amines, aromatic amines and/or mixtures thereof. The hardeners may either participate stoichiometrically in the curing reaction or they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and very particularly cyanoguanidine (dicyandiamide).

Examples of suitable guanamine derivatives which may be mentioned are alkylated benzoguanamine resins, benzoguanamine resins or methoxymethylethoxymethylbenzoguanamine. The selection criterion for the single component, thermosetting hot-melt adhesives is, of course, the low solubility of these substances in the resin system at room temperature, such that solid, finely ground hardeners are preferred for this use, with dicyandiamide in particular being suitable. This ensures good storage stability of the composition.

Catalytically active substituted ureas may be used in addition to or instead of the above-mentioned hardeners. Such ureas in particular comprise p-chlorophenyl-N,N-dimethylurea (Monuron), 3-phenyl-1,1-dimethylurea (Fenuron) or 3,4-dichlorophenyl-N,N-dimethylurea (Diuron). Catalytically active aryl- or alkyl-amines, such as benzyldimethylamine, tris(dimethylamino)phenol, piperidine or piperidine derivatives, may in principle also be used, but many of these are too highly soluble in the adhesive system, such that the storage stability of the single component system is inadequate for practical purposes. Various preferably solid imidazole derivatives may furthermore be used as catalytically active accelerators. Examples which may be mentioned are 2-ethyl-2-methylimidazole, N-butylimidazole, benzimidazole and N—C1–C12 alkylimidazoles or N-arylimidazoles.

The adhesives according to the present invention generally also contain known fillers, such as the various ground or precipitated chalks, carbon black, calcium/magnesium carbonates, barytes, as well as in particular silicate fillers of the aluminum/magnesium/calcium silicate type, for example wollastonite, chlorite.

The adhesive compositions according to the present invention may also contain further conventional auxiliary substances and additives, such as plasticisers, reactive diluents, rheology auxiliaries, wetting agents, antioxidants, stabilisers and/or colored pigments.

The adhesives according to the present invention may, on the one hand, be formulated as single component adhesives, wherein these may be formulated both as highly viscous, hot-applicable adhesives and as thermally curable hot-melt adhesives. These adhesives may also be formulated as single component pre-gellable adhesives, in which case the compositions contain either finely divided thermoplastic powders, such as polymethacrylates, polyvinyl butyral or other thermoplastic (co)polymers or the curing system is tailored such that the curing process proceeds in two-stages, wherein the gelation step brings about only partial curing of the adhesive and, in automotive construction, final curing occurs, for example, in a lacquering oven, preferably in the cathodic dipcoating oven.

The adhesive compositions according to the present invention may also be formulated as two-component epoxy adhesives, in which the two reaction components are mixed together only shortly before application, wherein curing then proceeds at room temperature or at moderately elevated temperature. The reaction components known for two-component epoxy adhesives, for example di- or polyamines, amino-terminated polyalkylene glycols (for example Jeffamine, amino-poly-THF) or polyaminoamides, may here be used as the second reaction component. Further reactive components may comprise mercapto-functional prepolymers, such as liquid thiokol polymers. The epoxy compositions according to the present invention may, in principle, also be cured with carboxylic anhydrides as the second reaction component in two-component adhesive formulations.

In addition to the above-stated applications, the adhesive compositions according to the present invention may also be used as casting resins in the electrical or electronics industry, as a die attach adhesive in electronics for bonding components to printed circuit boards. Further possible applications for the compositions according to the present invention are as matrix materials for composite materials, such as fiber-reinforced composites.

Further preferred applications for the adhesive compositions according to the present invention both in the single component, heat-curable form and in the two-component comprise the use thereof as a structural foam, for example for providing internal stiffening in cavities in vehicle construction, wherein the expanded structural foams provide stiffening in the cavities of the vehicle or increase the energy absorption capacity. The compositions may also be used for producing "stiffening pads" or for stiffening coatings for thin sheet metal or plastics components, preferably in vehicle construction.

One particularly preferred application for the adhesives according to the present invention is, however, for structural bonds in vehicle construction.

The adhesive is employed in a process for the bonding of metallic and/or composite materials characterized by the following process steps:
 (i) application of the adhesive to at least one of the substrate surfaces to be joined, optionally after prior cleaning and/or surface treatment;
 (ii) joining of the components;
 (iii) optionally, pregelation of the adhesive composition;
 (iv) curing the adhesive by heating to temperatures of between 80° C. and 210° C., preferably between 120 and 180° C.

Depending upon the requirements on the adhesive with regard to its processing characteristics, flexibility, impact/peel strength or tensile strength, the quantity ratios of the individual components may vary within relatively broad limits. Typical ranges for the essential components are:

component (A): 10–45 wt. %, preferably 15–30 wt. %, wherein this component is composed of one or more liquid and/or solid epoxy resins and may optionally also contain low molecular weight epoxides as reactive diluents;

component (B): 5–25 wt. %, preferably 10–20 wt. %;

hardener component (C) (for thermally curable single component systems): 1–10 wt. %, preferably 3–8 wt. %;

component (D): 0–30 wt. %, preferably 5–20 wt. %, component (E): 0 to 30 wt. %;

fillers: 10–40 wt. %, accelerator: 0.01 to 3 wt. %, preferably 0.1 to 0.8 wt. %;

rheology auxiliary (thixotropic agent): 0.5–5 wt. %;

wherein the sum of the constituents is 100% and the composition contains at least one of (D) and (E).

As mentioned above, the requirements placed upon modern structural adhesives in vehicle construction are constantly increasing as ever more assemblies, including load-bearing assemblies, are joined by adhesive bonding methods. As has already been explained in the paper by G. Kötting and S. Singh, "Anforderungen an Klebstoffe für Strukturverbindungen im Karosseriebau" [=Requirements of Adhesives for Structural Vehical Body Construction], Adhesion 1988, issue 9, pages 19 to 26, the adhesives must firstly meet practical production requirements, such as automatable processing using short cycle times, adhesion to oiled metal sheets, adhesion to various types of metal sheets and compatibility with the processing conditions prevailing in the coating line (resistance to rinsing and phosphating baths, curable during stoving of cathodic dipcoated primer, resistance to subsequent lacquering and drying operations). Modern structural adhesives must furthermore also meet rising strength and deformation properties in the cured state. Such properties include the increased corrosion resistance and flexural rigidity of structural components, as well as deformability on exposure of the adhesive bond mechanical stress. The highest possible component deformability provides a considerable safety advantage on exposure to impact stress in an accident (crash behavior). This behavior may best be monitored by determining the impact energy for cured adhesive bonds, with sufficiently high impact energy or impact/peel energy being desirable or necessary both at elevated temperatures of up to +90° C. and in particular also at low temperatures of down to 40° C. The highest possible tensile shear strength should simultaneously also be achieved. Both types of strength must be achieved on numerous substrates, primarily oiled metal sheets, such as bodywork sheet steel, sheet steel galvanised by the most varied methods, sheets of various aluminum alloys or also magnesium alloys and coil-coated sheet steel provided with organic coatings of the "Bonazinc" or "Granocoat" type. As will be demonstrated in the Examples below, the adhesive compositions according to the present invention surprisingly to a very great extent meet these requirements.

The following Examples are intended to illustrate the invention in greater detail. Unless otherwise indicated, all quantities in the compositions are stated in parts, by weight.

EXAMPLES

General Production Method for Component (B)

A carboxy-terminated poly(butadiene-co-acrylonitrile) (Hycar CTBN 1300×3) was reacted under a nitrogen atmosphere with stirring at 140° C. with an about 10 molar excess of a liquid DGEBA epoxy resin for 3 hours until constancy of the reaction. (DGEBA=bisphenol A diglycidyl ether).

General Production Method for Component (D)

1 mol of the carboxylic anhydride was reacted under a nitrogen atmosphere with stirring at 120–190° C. and 0.01–100 mbar for 3 to 5 hours with 0.4 to 0.7 mol of a difunctional amino-terminated polyalkylene glycol, wherein the amine was initially introduced at 130° C. and, once the carboxylic anhydride had been added, the pressure was gradually reduced. The reaction product is optionally reacted at 80–120° C. for 30–120 minutes with 2 to 4 times its mass of an epoxy resin and 0.2 to 0.5 wt. % of triphenyl phosphine.

General Production Method for Component (E)

1 mol of the carboxylic anhydride was reacted under a nitrogen atmosphere with stirring at 100–190° C. for 30 to 180 minutes with 0.2 to 0.5 mol of a difunctional amino-terminated polyalkylene glycol. The reaction product is optionally reacted at 100° C. for 1–2 hours with 2 to 4 times its mass of an epoxy resin and 0.2 to 0.5 wt. % of triphenyl phosphine until constancy of the reaction.

General Production Method for the Adhesive

All the components were mixed at room temperature or, where appropriate, at 70° C. to max. 80° C. in a kneader until homogeneous and then packaged in storage containers while hot.

Examples 1 and 2

The resins shown in Table 1 were produced in accordance with the general method for component (D).

TABLE 1

| Example | 1 | 2 |
|---|---|---|
| D-2000 | 1026 | 513 |
| PMSA | 224 | 112 |
| DGEBA | 0 | 1438 |

D-2000: Jeffamine D-2000 (Huntsman), difunctional amino-terminated polypropylene glycol, MW 2000
DGEBA: DGEBA resin, epoxy equivalent weight 189

Examples 3–5

The resins shown in Table 2 were produced in accordance with the general method for component (E).

TABLE 2

| Example | 3 | 4 | 5 |
|---|---|---|---|
| T-3000 | 220 | 0 | 200 |
| T-5000 | 0 | 200 | 0 |
| PMSA | 0 | 0 | 32.2 |
| MSA | 20.1 | 0 | 0 |
| TMSA | 0 | 20.4 | 14.2 |

TABLE 2-continued

| Example | 3 | 4 | 5 |
|---|---|---|---|
| DGEBA | 538 | 0 | 0 |
| Reaction conditions | 100° C./30 min | 165° C./3 h | 160° C./3 h |

T-3000: Jeffamine T-3000 (Huntsman), trifunctional amino-terminated polypropylene glycol, MW 3000
T-5000: Jeffamine T-5000 (Huntsman), trifunctional amino-terminated polypropylene glycol, MW 5000
DGEBA: DGEBA resin, epoxy equivalent weight 189
Reaction conditions: Reaction conditions for the reaction of the amine with the anhydride
PMSA: pyromellitic anhydride
MSA: maleic anhydride
TMSA: trimellitic anhydride A product comprising 40% butyl rubber and having an epoxy equivalent weight of 900 and a viscosity of 200 Pa·s at 80° C. was produced in accordance with the general method for component (B) from Hycar CTBN 1300×13 and a liquid DGEBA resin.

Examples 6–9

Adhesive compositions according to the present invention were produced in accordance with the general production method for the adhesive from components (D) according to Examples 1 and 2, components (E) according to Examples 3 to 5, component (B) and a liquid DGEBA resin (epoxy equivalent weight 189, component (A), dicyandiamide as hardener, accelerators and hydrophobic silica as thixotropic agent. Table 3 summarises the compositions.

TABLE 3

| Example | 6 | 7 | 8 | 9 |
|---|---|---|---|---|
| Component (D) from Example 1 | 25 | 25.0 | 25.0 | 0 |
| Component (D) from Example 2 | 0 | 0 | 0 | 83.5 |
| Component (E) from Example 3 | 0 | 0 | 81.3 | 81.3 |
| Component (E) from Example 4 | 0 | 25.0 | 0 | 0 |
| Component (E) from Example 5 | 25.0 | 0 | 0 | 0 |
| Component (B) | 55.0 | 55.0 | 55.0 | 55.0 |
| DGEBA | 127.2 | 127.2 | 71.1 | 12.8 |
| Dicyandiamide | 17.5 | 17.5 | 17.5 | 17.5 |
| Fenuron | 0.25 | 0.25 | 0.25 | 0.25 |
| Silica | 10.0 | 10.0 | 10.0 | 10.0 |

DGEBA: DGEBA resin, epoxy equivalent weight 189
Silica: Cabosil TS 720

Table 4 compares the adhesive properties of the Examples according to the present invention and the adhesive properties of prior art adhesives. The adhesive in comparative test 1 is Terokal 5051 from Henkel Teroson, which was produced on the basis of the teaching of EP-A-0 354 498. The adhesive in comparative test 2 is a conventional prior art commercial product. It is assumed that this adhesive was produced on the basis of the teaching of EP-A-0 308 664.

TABLE 4

| Example | 6 | 7 | 8 | 9 | Comp. 1 | Comp. 2 |
|---|---|---|---|---|---|---|
| Impact −40° C. [J] | 1.5 | 9.6 | 21.1 | 21.8 | 0.5 | 3.3 |
| Impact −20° C. [J] | 17.5 | 18.2 | 27.3 | 25.1 | 0.4 | 2.6 |
| Impact 0° C. [J] | 14.1 | 19.1 | 25.9 | 22.3 | 0.9 | 4.4 |
| Impact 23° C. [J] | 22.3 | 22.0 | 28.0 | 28.0 | 2.1 | 5.2 |

TABLE 4-continued

| Example | 6 | 7 | 8 | 9 | Comp. 1 | Comp. 2 |
|---|---|---|---|---|---|---|
| ZSF 23° C. [MPa] | 33 | 31 | 34 | 33 | 21.8 | 21.6 |
| ZSF 90° C. [MPa] | 28 | 24 | 24 | 20 | 10.9 | 11.1 |

Impact: Impact/peel test to ISO 11343 at 2 m/s
ZSF: tensile shear strength to DIN 53283

The advantage of the adhesive compositions according to the present invention according to Examples 6–9 is clear from the adhesive properties shown in Table 4 on comparison with the prior art according to the Comparative Examples. The Examples according to the present invention exhibit very high impact/peel strength to ISO 11343 at elevated impact speed, as is particularly evident from the elevated impact/peel energies at the low temperatures of −20° C. and −40° C. These compositions simultaneously exhibit elevated tensile shear strength to DIN 53283 even at elevated temperatures of 90° C. and exhibit values for both properties which are far superior to those of the prior art composition.

Examples 10–14 and Comparison Examples 3–6

The resins listed in Table 5 were prepared in accordance with the general preparation of component (E).

TABLE 5

| Example | 10 | 11 | 12 | 13 | 14 |
|---|---|---|---|---|---|
| T-3000 | 220 | 0 | 200 | 0 | 220 |
| T-5000 | 0 | 200 | 0 | 200 | 0 |
| PMAA | 0 | 0 | 32.2 | 7.4 | 0 |
| MAA | 24.2 | 0 | 0 | 0 | 20.1 |
| TMAA | 0 | 20.4 | 14.2 | 12.7 | 0 |
| Reaction cond. | 120° C./ 2 h | 165° C./ 3 h | 160° C./ 3 h | 160° C./ 3 h | 100° C./ 0.5 h |

T-3000: Jeffamine T-3000 (Huntsman), trifunctional polypropylene glycol having amino end groups, MW about 3,000
T-5000: Jeffamine T-5000 (Huntsman), trifunctional polypropylene glycol having amino end groups, MW about 5,000
PMAA: Pyromellitic acid dianhydride
MAA: Maleic acid anhydride
TMAA: Trimellitic acid anhydride A product having 40% butyl rubber and an epoxide equivalent weight of 900, viscosity at 80° C. 200 Pa.s, was prepared from Hycar CTBN 1300×13 and a liquid DGEBA resin in accordance with the general preparation of component (B).

The resins listed in Table 6, which are based on divalent polyethers, were prepared in accordance with the teaching of EP 0 381 625 as comparison examples 3–6:

TABLE 6

| Comparison example | 3 | 4 | 5 | 6 |
|---|---|---|---|---|
| D-2000 | 297.3 | 230 | 250 | 0 |
| XTJ-523 | 0 | 0 | 0 | 200 |
| SAA | 0 | 23.3 | 0 | 0 |
| MAA | 28.6 | 0 | 0 | 19.2 |
| PAA | 0 | 0 | 37.4 | 0 |
| Reaction cond. | 100° C. 0.5 h | 120° C. 2 h | 120° C. 2 h | 100° C. 0.5 h |

D-2000: Jeffamine D-2000 (Huntsman), difunctional amino-terminated polypropylene glycol, MW about 2,000
XTJ-523: Jeffamine XTJ-523 (Huntsman), difunctional amino-terminated 1,2-polybutylene oxide, MW 2,000
SAA: Succinic acid anhydride
MAA: Maleic acid anhydride
PAA: Phthalic acid anhydride

Examples 15–25 and Comparison Examples 7–10

Adhesive compositions according to the present invention were prepared in accordance with the general preparation of the adhesive from components (E) according to examples 10 to 14, component (B) and a liquid DGEBA resin (epoxide equivalent weight 189, component (A)), dicyandiamide as the hardener, accelerators and hydrophobic silica as a thixotropic agent. The compositions are summarized in Table 7.

TABLE 7

| Example | 15 | 16 | 17 | 18 | 19 | 20 | 21 | 22 | 23 | 24 | 25 |
|---|---|---|---|---|---|---|---|---|---|---|---|
| Component (E) from example 10 | 50.0 | 0 | 0 | 0 | 0 | 0 | 0 | 0 | 0 | 0 | 0 |
| Component (E) from example 11 | 0 | 49.7 | 0 | 0 | 0 | 0 | 25.0 | 0 | 25.0 | 0 | 25.0 |
| Component (E) from example 12 | 0 | 0 | 50.0 | 0 | 0 | 25.0 | 0 | 0 | 25.0 | 25.0 | 0 |
| Component (E) from example 13 | 0 | 0 | 0 | 50.0 | 0 | 0 | 0 | 25.0 | 0 | 25.0 | 25.0 |
| Component (E) from example 14 | 0 | 0 | 0 | 0 | 75.0 | 25.0 | 25.0 | 25.0 | 0 | 0 | 0 |
| Component (B) | 55.0 | 55.0 | 55.0 | 55.0 | 55.0 | 55.0 | 55.0 | 55.0 | 55.0 | 55.0 | 55.0 |
| DGEBA | 117.3 | 112.1 | 117.2 | 117.2 | 94.7 | 127.2 | 127.2 | 127.2 | 127.2 | 127.2 | 127.2 |
| Dicyandiamide | 17.5 | 17.5 | 17.5 | 17.5 | 15.0 | 17.5 | 17.5 | 17.5 | 17.5 | 17.5 | 17.5 |
| Fenuron | 0.25 | 0.25 | 0.25 | 0.25 | 0.25 | 0.25 | 0.25 | 0.25 | 0.25 | 0.25 | 0.25 |
| Resorcinol | 0 | 5.4 | 0 | 0 | 0 | 0 | 0 | 0 | 0 | 0 | 0 |
| Silica | 10.0 | 10.0 | 10.0 | 10.0 | 10.0 | 10.0 | 10.0 | 10.0 | 10.0 | 10.0 | 10.0 |

DGEBA: DGEBA resin, epoxide equivalent weight 189
Silica: Cabosil TS 720

Adhesive compositions were prepared as comparison examples 7 to 10 in accordance with the teaching of EP 0 381 625 from the components according to comparison examples 3 to 6, component (B) and a liquid DGEBA resin (epoxide equivalent weight 189, component (A), dicyandiamide as the hardener, accelerators and hydrophobic silica as a thixotropic agent. The compositions are summarized in Table 8.

TABLE 8

| Comparison example | 7 | 8 | 9 | 10 |
|---|---|---|---|---|
| Component from comparison example 3 | 50.0 | 0 | 0 | 0 |
| Component from comparison example 4 | 0 | 50.0 | 0 | 0 |
| Component from comparison example 5 | 0 | 0 | 50.0 | 0 |
| Component from comparison example 6 | 0 | 0 | 0 | 50.0 |
| Component (B) | 55.0 | 55.0 | 55.0 | 55.0 |
| DGEBA | 117.2 | 117.2 | 117.2 | 117.2 |
| Dicyandiamide | 17.5 | 17.5 | 17.5 | 17.5 |
| Fenuron | 0.25 | 0.25 | 0.25 | 0.25 |
| Silica | 10.0 | 10.0 | 10.0 | 10.0 |

DGEBA: DGEBA resin, epoxy equivalent weight 189
Silica: Cabosil TS720

The adhesive properties of the examples according to the present invention 15–25 and the adhesive properties of adhesives according to the prior art are compared in Table 9. Comparison examples 7–10 are adhesives according to the teaching of EP 0 381 625, as listed in Table 6. The adhesive of comparison example 11 is Terokal 5051 from Henkel Teroson, and this adhesive was prepared on the basis of the teaching of EP-A-0 354 498. The adhesive of comparison example 12 is a commercially available product of the prior art (Betamate 1044/3, Gurit Essex). It is assumed that this adhesive was prepared on the basis of the teaching of EP-A-0 308 664.

TABLE 9

|  | Example | | | | | | | | | | | comparison Example | | | | | |
| --- | --- | --- | --- | --- | --- | --- | --- | --- | --- | --- | --- | --- | --- | --- | --- | --- | --- |
|  | 15 | 16 | 17 | 18 | 19 | 20 | 21 | 22 | 23 | 24 | 25 | 7 | 8 | 9 | 10 | 11 | 12 |
| Impact −40° C. [J] | 14.3 | 11.8 | 14.9 | 9.9 | 1.4 | 7.6 | 17.4 | 16.8 | 13.2 | 10.6 | 9.6 | 1.0 | 0.4 | 0.6 | 3.0 | 0.5 | 3.3 |
| Impact −20° C. [J] | 15.8 | 16.2 | 22.1 | 16.2 | 13.6 | 25.6 | 20.6 | 22.6 | 22.1 | 21.8 | 18.3 | 4.0 | 0.5 | 0.7 | 5.2 | 0.4 | 2.6 |
| Impact 0° C. [J] | 17.7 | 17.3 | 19.2 | 15.6 | 22.8 | 25.4 | 24.7 | 22.6 | 25.2 | 27.0 | 22.1 | 17.8 | 1.1 | 1.5 | 13.4 | 0.9 | 4.4 |
| Impact 23° C. [J] | 22.8 | 21.2 | 21.1 | 17.7 | 25.2 | 26.8 | 23.6 | 23.1 | 28.6 | 28.6 | 24.7 | 15.3 | 3.0 | 2.0 | 13.7 | 2.1 | 5.2 |
| TSS 23° C. [MPa] | 37 | 35 | 32 | 30 | 33 | 35 | 36 | 35 | 36 | 35 | 34 | 36 | 11 | 12 | 34 | 21.8 | 21.6 |
| TSS 90° C. [MPa] | 24 | 19 | 21 | 22 | 16 | 22 | 23 | 22 | 24 | 21 | 23 | 18 | 7 | 9 | 14 | 10.9 | 11.1 |

Impact: Impact-peel test according to ISO 11343 at 2 m/s
TSS: Tensile shear strength according to DIN 53283

The adhesive properties listed in Table 9 clearly show the advantage of the adhesive compositions according to the present invention of Examples 15–25, when these are compared with comparison examples 7–12 according to the prior art. The samples according to the present invention show a very high impact-peel strength according to ISO 11343 at high impact speeds. This is shown in particular by high impact-peel work values at the low temperatures of −20 and −40° C. At the same time, these compositions also have a high tensile shear strength according to DIN 53283 at high temperatures of 90° C., and in both values are far superior to the composition according to the prior art.

What is claimed is:

1. A thermally curable composition comprising:
   (A) at least one epoxy resin having on average more than one epoxy group per molecule;
   (B) a copolymer having a glass transition temperature of −30° C. or lower and epoxy-reactive groups or a reaction product of such copolymer with a stoichiometric excess of at least one epoxy resin according to (A);
   (C) at least one latent hardener activatable at elevated temperature, for component (A); and either
   (D) a reaction product obtained from a difunctional amino-terminated polymer and a tri- or tetra-carboxylic acid anhydride having on average more than one imide group and carboxyl group per molecule; or
   (E) a reaction product produced from a tri- or poly-functional polyol or a tri- or poly-functional amino-terminated polymer and a cyclic carboxylic anhydride, which reaction product contains on average more than one carboxyl group per molecule, or
   (F) a mixture of the reaction products according to (D) and (E).

2. A composition as claimed in claim 1 wherein component (B) is a copolymer based on butadiene.

3. A composition as claimed in claim 1 wherein component (B) is (a) a copolymer containing carboxyl groups based on butadiene/acrylonitrile copolymer, butadiene/(meth)acrylic acid ester copolymer, butadiene/acrylonitrile/styrene copolymer, or butadiene/(meth)acrylate/styrene copolymer or (b) a dendrimer.

4. A composition as claimed in claim 1 wherein component (B) is a core/shell polymer, the core of which is a diene polymer or a (meth)acrylic polymer having a glass transition temperature of −30° C. or lower and which may optionally be crosslinked with 0.01 to 5 wt. % of a diolefinic comonomer and the shell of which has a glass transition temperature of 60° C. or higher and is synthesised from one or more monomers selected from the group consisting of alkyl (meth)acrylate, (meth)acrylonitrile, (methyl)styrene, olefinically unsaturated carboxylic acids, carboxylic anhydrides and mixtures thereof.

5. A composition as claimed in claim 1 wherein component (D) is produced by a condensation reaction from:
   (a) a carboxylic anhydride selected from the group consisting of citric anhydride, 1,2,3-propane tricarboxylic anhydride, aconitic anhydride, 1,2,3-benzenetricarboxylic anhydride, 1,2,4-benzenetricarboxylic anhydride, mellophanic anhydride, pyromellitic anhydride, 1,8:4,5-naphthalenetetracarboxylic dianhydride, 2,3:6,7-naphthalenetetracarboxylic dianhydride, perylene dianhydride, biphenyltetracarboxylic dianhydride, diphenyl ether tetracarboxylic dianhydride, diphenylmethanetetracarboxylic dianhydride, 2,2-diphenylpropanetetracarboxylic dianhydride, benzophenonetetracarboxylic dianhydride, diphenyl sulfone tetracarboxylic dianhydride and mixtures thereof; and
   (b) a diamine seiected from the group consisting of polyethylene glycol diamine, polypropylene glycol diamine, polyoxytetramethylene diamine and polybutadiene diamine;
   wherein the reaction product contains on average more then one cyclic imide group and carboxyl group per molecule.

6. A composition as claimed in claim 1 wherein component (E) is produced from:
   (a) a carboxylic anhydride selected from the group consisting of citric anhydride, 1,2,3-propanetricarboxylic anhydride, aconitic anhydride, maleic anhydride, succinic anhydride, glutaric anhydride, adipic anhydride, pimelic anhydride, suberic anhydride, azelaic anhydride, sebacic anhydride, phthalic anhydride, 1,2,3-benzenetricarboxylic anhydride, 1,2,4-benzenetricarboxylic anhydride, mellophanic anhydride, pyromellitic anhydride, 1,8:4,5-naphthalenetetracarboxylic dianhydride, 2,3:6,7-naphthalenetetracarboxylic dianhydride, perylene dianhydride dianhydride, biphenyltetracarboxylic anhydride, diphenyl ether tetracarboxylic dianhydride, diphenylmethanetetracarboxylic dianhydride, 2,2-diphenyl-propanetetracarboxylic dianhydride, benzophenonetetracarboxylic dianhydride, diphenyl sulfone tetracarboxylic dianhydride and mixtures thereof; and
   (b) a polymer selected from the group consisting of polyethylene glycol triamine, polypropylene glycol triamine, polyoxytetramethylene triamine polybutadiene triamine, trifunctional polyoxyethylene polyol, trifunctional polyoxypropylene polyol, trifunctional polyoxytetramethylene polyol, copolymers thereof and OH-functional polybutadiene;
   wherein the reaction product contains on average more than one carboxyl group per molecule.

7. A composition as claimed in claim 5 wherein said component (D) is dissolved in at least one liquid polyepoxide.

8. A composition as claimed in claim 6 wherein said component (E) is dissolved in at least one liquid polyepoxide.

9. A composition as claimed in claim 5 wherein said component (D) is reacted with a stoichiometric excess of at least one polyepoxide.

10. A composition as claimed in claim 6 wherein said component (E) is reacted with a stoichiometric excess of at least one polyepoxide.

11. A composition as claimed in claim 1 wherein said latent hardener (C) is at least one compound selected from the group consisting of dicyandiamide, guanamines, guanidines, aminoguanidines solid aromatic diamines and a curing accelerator.

12. A composition as claimed in claim 1 additionally comprising one or more auxiliaries selected from the group consisting of plasticizers, reactive diluents, rheology auxillaries, fillers, wetting agents, antioxidants and stabilizers.

13. A composition as claimed in claim 1 which has been cured by heating the composition to temperatures of between 80 and 210° C.

14. A process for adhesive bonding a first substrate to a second substrate comprising:
    (1) applying to at least one of the substrate surfaces to be joined a thermally curable adhesive as claimed in claim 1;
    (2) joining the first substrate and the second substrate; and
    (3) curing the thermally curable adhesive by heating.

15. A process according to claim 14 additionally comprising cleaning or surface treating or both cleaning and surface treating the substrate surface to which the thermally curable adhesive is applied prior to applying the thermally curable adhesive.

16. A process according to claim 14 wherein the thermally curable adhesive is heated to temperatures between 80 and 210° C.

17. A process according to claim 14 wherein the thermally curable adhesive is pregelled prior to curing.

* * * * *

UNITED STATES PATENT AND TRADEMARK OFFICE
CERTIFICATE OF CORRECTION

PATENT NO.       : 6,884,854 B2
APPLICATION NO.  : 10/257308
DATED            : April 26, 2005
INVENTOR(S)      : Schoenfeld et al.

It is certified that error appears in the above-identified patent and that said Letters Patent is hereby corrected as shown below:

<u>Title Page</u>, and column 1, line 5:
item (54), last line, delete "POLYAMIDE" and insert therefor --POLYIMIDE--.
    (56) OTHER PUBLICATIONS, first ref., second line, delete "Soci" and insert therefor --Society--.

<u>Column 18</u>
Line 37, delete "then" and insert therefor --than--.
Line 52, delete "dianhydride".

Column 19, line 20, delete "auxillaries" and insert therefor --auxiliaries--.

Signed and Sealed this

Fifteenth Day of August, 2006

JON W. DUDAS
*Director of the United States Patent and Trademark Office*